(12) United States Patent
Heer et al.

(10) Patent No.: US 7,345,995 B2
(45) Date of Patent: Mar. 18, 2008

(54) CONFLICT RESOLUTION IN DATA STREAM DISTRIBUTION

(75) Inventors: Christoph Heer, Neubiberg (DE); Andreas Kirstädter, Ebersberg (DE)

(73) Assignee: Infineon Technologies AG, Munich (DE)

( * ) Notice: Subject to any disclaimer, the term of this patent is extended or adjusted under 35 U.S.C. 154(b) by 730 days.

(21) Appl. No.: 10/467,260

(22) PCT Filed: Feb. 14, 2002

(86) PCT No.: PCT/EP02/01578

§ 371 (c)(1),
(2), (4) Date: Jan. 20, 2004

(87) PCT Pub. No.: WO02/080469

PCT Pub. Date: Oct. 10, 2002

(65) Prior Publication Data

US 2004/0136391 A1    Jul. 15, 2004

(30) Foreign Application Priority Data

Feb. 16, 2001 (DE) .................. 101 07 433

(51) Int. Cl.
*H04L 5/12* (2006.01)
*H04J 1/16* (2006.01)

(52) U.S. Cl. ............ 370/229; 370/231; 370/235; 370/236

(58) Field of Classification Search ........ 370/413, 370/395, 236, 231, 229, 236.1
See application file for complete search history.

(56) References Cited

U.S. PATENT DOCUMENTS 5,687,324 A    11/1997    Green et al.
5,745,489 A    4/1998    Diaz et al.
5,862,128 A    1/1999    Cooperman et al.

FOREIGN PATENT DOCUMENTS

DE    41 31 780    3/1993
DE    197 07061    8/1998
DE    199 35126    8/2001

OTHER PUBLICATIONS

Badran, H.F and Mouftah, H.T., Head of line arbitration in ATM switches with input-output buffering and backpressure control; Globecom 1991; Dec. 5, 1991 pp. 347-351 vol. 1.*
Ivan P. K. Kaminow, Tingye Li, Elsevier, 2002,pp. 530 last paragraph and 531 first paragraph.*
Schaum's Outline of Computer Networking by Ed Tittel, 2002, Chapter 5, ATM Switching; p. 128.*
Haase G., "Zelltests in ATM-Netzen", *Funkschau*, Aug. 1997; pp. 52-57.

* cited by examiner

*Primary Examiner*—Chirag G. Shah
*Assistant Examiner*—Henry Baron
(74) *Attorney, Agent, or Firm*—Fish & Richardson P.C.

(57) ABSTRACT

The invention relates to a circuit arrangement for data stream distribution with conflict resolution, whereby data streams are transmitted bi-directionally, such that first data stream connection units (104a-104n) and second data stream connection units (105a-105m) serve as both input and output connections. A distribution unit (100), essentially comprises a matrix switching unit (101), first intermediate buffer units (106a-106n) and second intermediate buffer units (107a-107m). Information is firstly evaluated in the cell head, which, together with information on the availability of intermediate buffer units, determine when a present data stream cell may be transmitted to a relevant output connection unit.

11 Claims, 4 Drawing Sheets

CONFLICT RESOLUTION IN DATA STREAM DISTRIBUTION

RELATED APPLICATIONS

This application is a U.S. national stage, under 35 USC 371, of International Application Number PCT/EP02/01578, filed Feb. 14, 2002, which claims the benefit of the priority date of German Patent Application Number 101 07 433.3, filed Feb. 16, 2001. The contents of these applications are incorporated herein by reference.

FIELD OF INVENTION

The present invention relates to distribution of data streams.

BACKGROUND

Normally, circuit arrangements for data stream distribution are designed according to the principle of "cross rail distribution". In this context, data streams applied to one or more input connections are forwarded to one or more output connections.

Besides this unidirectional method, bidirectional methods are known which permit cross-rail distributor connections to act both as inputs and as outputs. The data streams to be forwarded—particularly bit data streams—exist in known protocols, for example in the known Ethernet V2/IEEE 802.3 protocol. Particularly in the case of bidirectional data stream transmission from one or more inputs/outputs to one or more outputs/inputs, conflicts can arise, since transmitting elements of a data stream precludes elements of a second data stream from being transmitted to the same output or from the same input at exactly the same time.

Great efforts have therefore been made to eliminate these input/output conflicts, and a number of methods have been proposed for this "conflict resolution" (contention resolution).

DE 19540160 describes a method for coordinating input-buffered ATM (Asynchronous Transfer Mode) switching centers in order to avoid output blockages. A cross rail distributor matrix operates in an entirely parallel manner, i.e. it switches a plurality of cells from different inputs to different outputs during the same interval of time. Since individual package transmissions by the system are normally entirely independent of one another, it is necessary to prevent a data cell from being connected to the same distributor rail matrix output during the same cell or slot period.

Conventional conflict resolution (contention resolution) is described in DE 19941851.9-31.

Apparatuses and methods for conflict resolution perform the following primary tasks, for example:

(a) Selection of data cells, with it being necessary to determine for each data cell period which data cells need to be connected from which inputs to individual cross-rail distributor matrix outputs. This subsidiary task of conflict resolution resolves any transmission conflicts for a plurality of inputs directed at the same distributor rail matrix output and has one or more of the following features:
  (i) Fairness: all of the inputs directed at the same output need to obtain the same share of the total throughput;
  (ii) High throughput: the operation of conflict resolution and of its fairness algorithms should impair a total system throughput as little as possible;
  (iii) Rapid manner of operation: since a new decision needs to be calculated for each data cell period, the calculation time required needs to be shorter than a cell slot time; and
  (iv) Simple implementability: the conflict resolution unit needs to be able to be implemented as a synchronous finite state machine, with no asynchronous parts being allowed by the data-stream layout regulations; and (b) Buffer devices need to be provided in order to buffer data cells which are not forwarded during the current data cell period in order to be able to forward them as appropriate at a later time.

The two tasks "selection" and "buffering" are thus of very great significance for data stream distribution and need to be performed by appropriate devices in the circuit arrangement.

DE 19935126.0 describes a cross rail distributor based system which contains an integrated conflict resolution unit. The task of selection is performed in a distributor device itself, while the task of buffering is performed on the basis of the prior art in the access units.

FIG. 5 shows a circuit arrangement for data stream distribution based on the prior art, where references starting with the digit "5" denote elements such as occur in circuit arrangements for data stream distribution and methods based on the prior art. One or more data stream lines are connected to first data stream connection units 504a-504n. Similarly, one or more data stream lines are connected to second data stream connection units 505a-505m. Both data stream connection units transmit data to and/or data from corresponding first access units 502a-502n and second access units 503a-503m. The first access units 502a-502n and the second access units 503a-503m are thus used both as inputs and as outputs for a central distributor device 500. The first access units 502a-502n and the second access units 503a-503m are connected to a matrix switching unit 501 contained in the distributor device 500.

For conflict resolution, it is necessary for the data streams supplied by first and second data stream connection units 504a-504n and 505a-505m not to be forwarded simultaneously to a single one of the corresponding output access units 502a-502n and 503a-503m in the same cell timeslot. For this reason, data are buffered in the first access units 502a-502n and in the second access units 503a-503m. The data stream distribution method in accordance with the prior art is based on data which cannot be forwarded to a desired access unit being buffered in the access unit at which the corresponding data stream arrives.

The information regarding whether or not a corresponding desired access unit is occupied is ascertained in the distributor device 500, so that relatively long information paths need to be provided between the respective first and second access units 502a-502n and 503a-503m and the matrix switching unit 501, since data are buffered in the access units 502a-502n and 503a-503m. Long information paths mean a long time delay which entails a problem in terms of short switching times. Such an arrangement based on the prior art is also described in DE 19935126.0, for example.

A primary drawback of such circuit arrangements for data stream distribution based on the prior art is that long information paths exist which in turn lengthen the switching times for the data streams.

Another drawback of apparatuses and methods for data stream distribution based on the prior art is that conventional conflict resolution limits the total data stream volume which can be transmitted.

SUMMARY

It is thus an object of the present invention to provide conflict resolution on the basis of selection of the data input streams and buffering of unforwarded data input streams, where data stream distribution is not slowed down by long information paths between access units and a central matrix switching unit.

The inventive circuit arrangement has the primary advantage that data streams can be distributed efficiently without andy data cell loss and with a minimal delay.

Another advantage of the present invention is that a flexible arrangement of appropriate distributor devices is made possible which allows access units to be arranged remotely from a distributor device without obtaining delay times for data stream distribution as a result of long information paths.

The essence of the invention is a circuit arrangement for data stream distribution in which temporary-buffer units are arranged within a distributor device and in which long information paths are avoided, with provision of return-stream information allowing the temporary-buffer units to be kept small.

Advantageously, information about an access unit in a distributor device, which information is likewise stored in a cell header, is made available quickly for further processing.

Another advantage is that data streams are forwarded effectively without data cell losses, with avoidance of data cell losses particularly as a result of access units' buffer capacities being exceeded.

It is also advantageous to provide a flexible arrangement for distributing data streams.

In line with one preferred development, a matrix switching unit in a distributor device has 24 inputs and 24 outputs.

In line with another preferred development of the present invention, data cells are buffered such that two data cells are never transmitted to the same access unit simultaneously within the same cell timeslot.

In line with yet another preferred development of the present invention, data alignment with buffer blocks contained in first and/or second access units is performed.

In line with yet another preferred development of the present invention, first and second data stream connection units have one or more connections for data lines.

In line with yet another preferred development of the present invention, information in a data-stream cell, running on in the data-stream direction, regarding the information contained in a distributor-device determination field and the information contained in an access-unit determination field is routed to a particular distributor device and to a particular access unit.

In line with yet another preferred development, if a predetermined threshold value is exceeded upon reaching a temporary-buffer filling level for temporary-buffer units, opposing-data-stream cells are formed which run in the opposing-data-stream direction and contain a backpressure determination field and a backpressure bit-vector field.

In line with yet another preferred development of the present invention, the temporary-buffer units are of small design, which allows high data throughputs. Such data throughputs can be in the order of magnitude of several 100 GB/s.

Exemplary embodiments of the invention are illustrated in the drawings and are explained in more detail in the description below. In the drawings:

In the figures, identical references denote components which are the same or have the same function.

DETAILED DESCRIPTION

Figure 1:
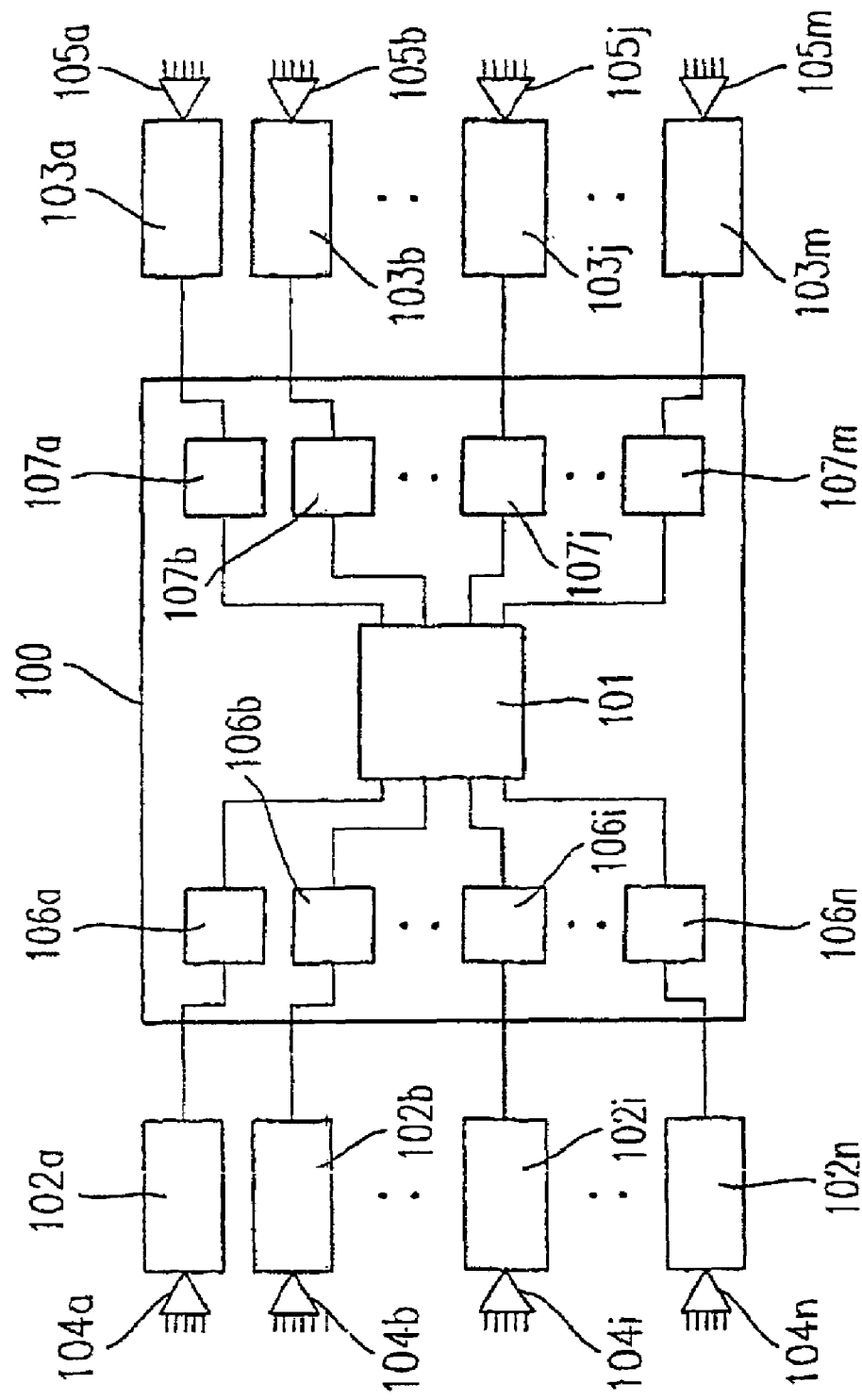
FIG. 1 shows a circuit arrangement for data stream distribution with conflict resolution in line with the present invention.

FIG. 1 shows a circuit arrangement for data stream distribution with conflict resolution in line with the present invention.

In the circuit arrangement for data stream distribution shown in FIG. 1, data streams are supplied to first data stream connection units $104a$-$104n$ and to second data stream connection units $105a$-$105m$. The inventive circuit arrangement and the inventive method permit data streams to be transmitted bidirectionally, so that the first data stream connection units $104a$-$104n$ and the second data stream connection units $105a$-$105m$ are used both as input connections and as output connections.

By way of example, FIG. 1 shows four first data stream connection units $104a$-$104n$ and four second data stream connection units $105a$-$105m$. However, it should be pointed out that two or more first data stream connection units can be connected to two or more second data stream connection units, with i being the sequential index and n being the total number of first data stream connection units, while j is the sequential index and m is the total number of second data stream connection units.

Besides electrical supply of the data streams which are to be distributed, optical supply lines for the data streams to be distributed are generally also provided to the first and second data stream connection units $104a$-$104n$ and $105a$-$105m$.

A distributor device 100 essentially comprises a matrix switching unit 101 and first temporary-buffer units $106a$-$106n$ and second temporary-buffer units $107a$-$107m$, the number of first temporary-buffer units $106a$-$106n$ corresponding to the number of first data stream connection units $104a$-$104n$, while the number of second temporary-buffer units $107a$-$107m$ corresponds to the number of second data stream connection units $105a$-$105m$. Data streams which are supplied via the first data stream connection units $104a$-$104n$ are supplied to the first temporary-buffer units $106a$-$106n$ via first access units $102a$-$102n$, while data streams which are supplied to second data stream connection units $105$-$105m$ are supplied to the second temporary-buffer units $107a$-$107m$ via second access units $103a$-$103m$.

The data streams are split into data cells, as described below with reference to FIGS. 2 to 4. In this context, the information in the cell header is first evaluated which, together with information about any use of temporary-buffer units, determines whether a current data stream cell can be forwarded directly to an associated output access unit or whether an opposing-data-stream cell is formed which is referred back to the corresponding access unit so as to be evaluated there.

Figure 2:
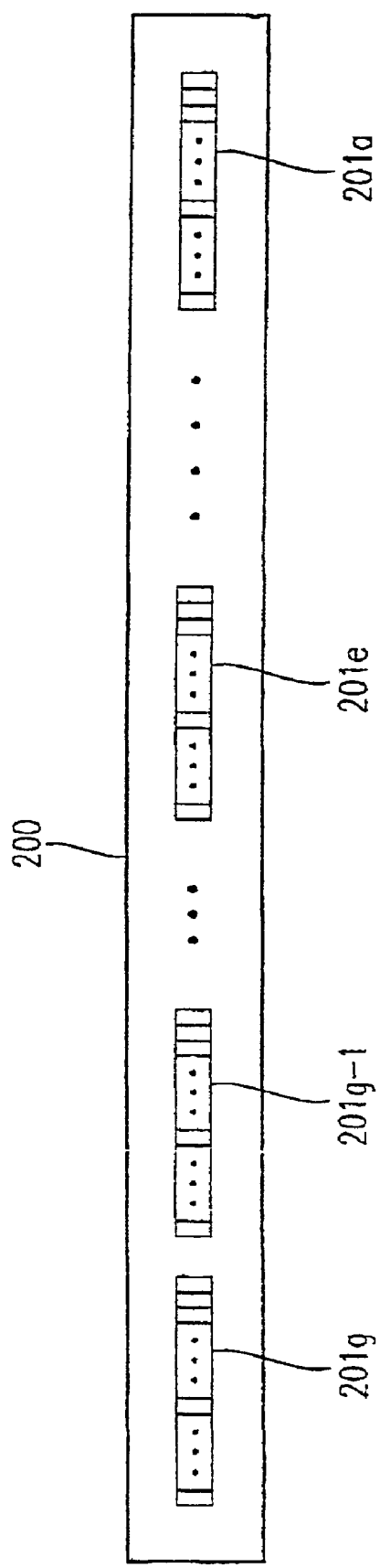
FIG. 2 shows the structure of a data stream which is supplied to access units in the circuit arrangement for data stream distribution in line with FIG. 1.

FIG. 2 shows the structure of a data stream which is supplied to access units in a circuit arrangement for data stream distribution in line with FIG. 1.

The data stream 200 shown in FIG. 2 comprises data stream cells 201a-201g, where k corresponds to the sequential index and g corresponds to the total number of data stream cells. Data stream cells shown are generally based on data packets of fixed length. The data stream cells 201a-201g carry the information which is to be transmitted and which is to be distributed in the inventive circuit arrangement, with a data stream cell header being used specifically for determining access units and distributor devices, for example, as will be described below with reference to FIGS. 3 and 4.

Figure 3:
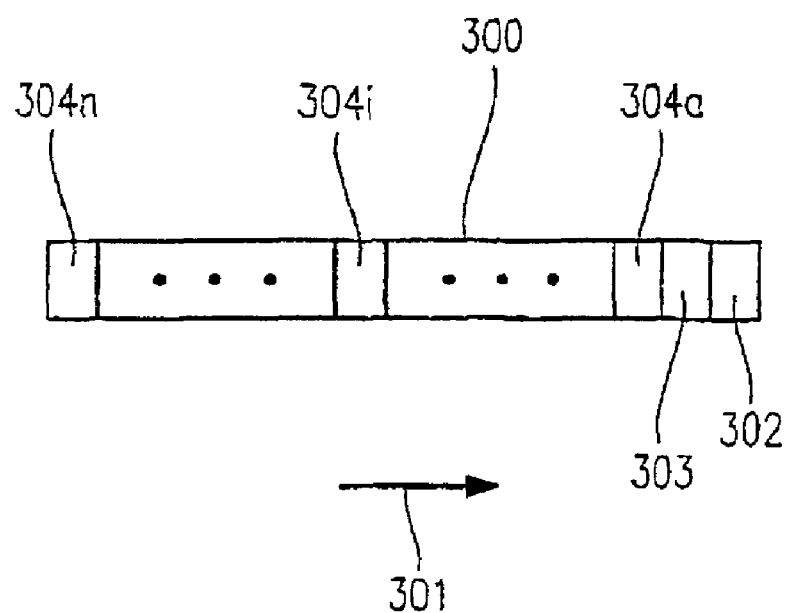
FIG. 3 shows the structure of a data stream cell running in the data stream direction.

FIG. 3 shows the structure of a data stream cell running in the data stream direction.

The data stream cell 300 shown in FIG. 3 propagates in the data stream direction 301 and comprises individual fields which are made up of fields in a cell header and data stream information fields 304a-304n (i=sequential index). A cell header comprises a distributor-device determination field 302 and an access-unit determination field 303. The distributor-device determination field 302 determines which distributor device 100 needs to be supplied with the data stream cell 300, while the access-unit determination field 303 stipulates which access unit 102a-102n or 103a-103m needs to be supplied with a data stream cell 300 within a distributor device 100.

Figure 4:
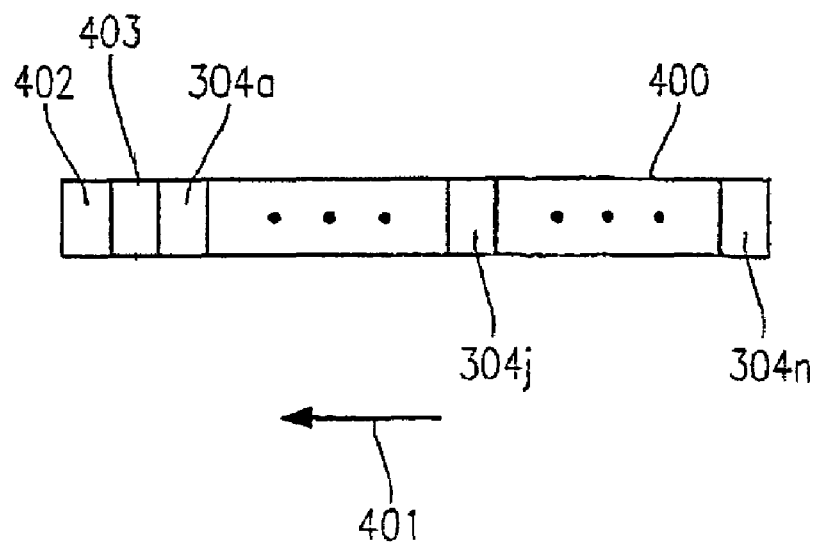
FIG. 4 shows the structure of an opposing-data-stream cell running in the opposing-data-stream direction.
Figure 5:
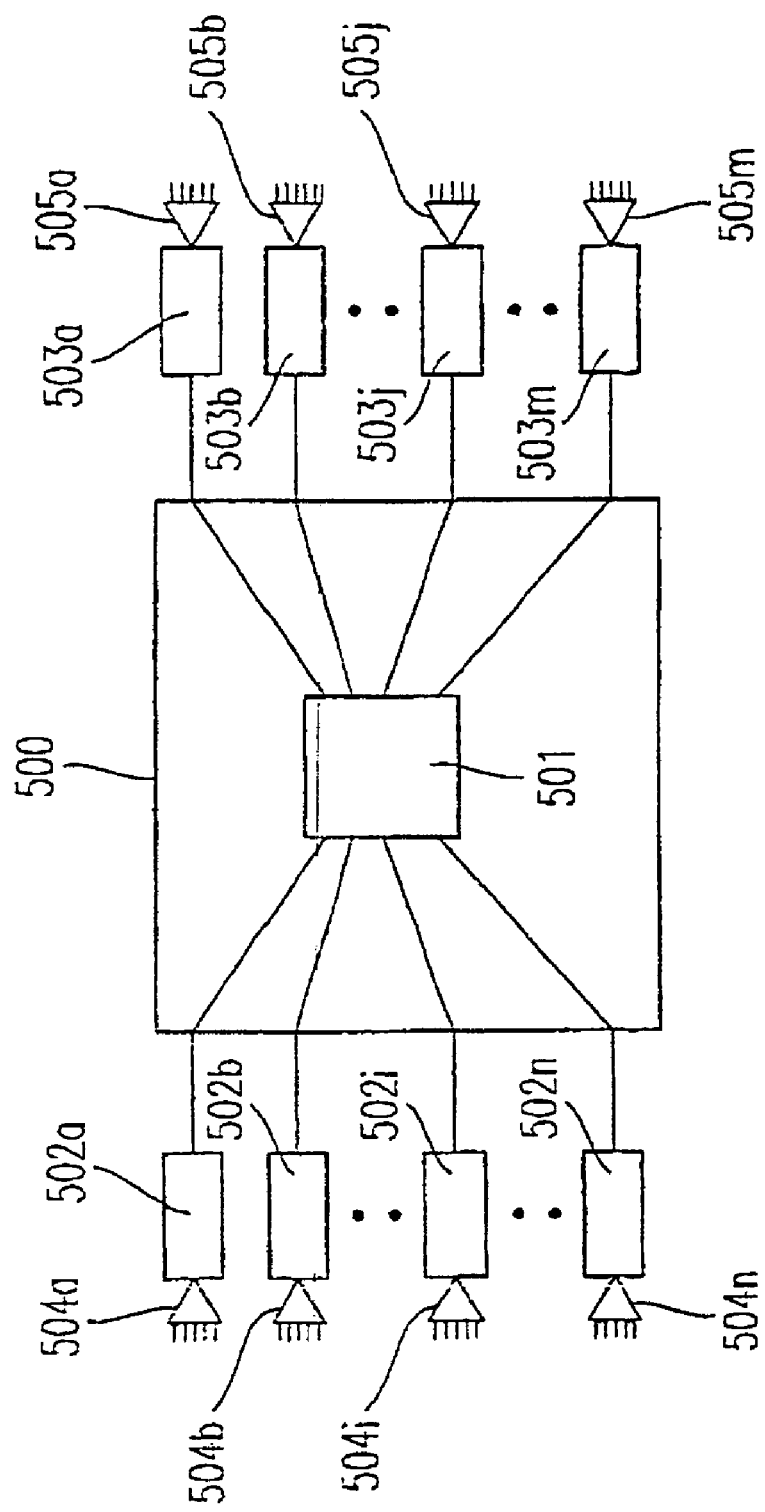
FIG. 5 shows a circuit arrangement for data stream distribution based on the prior art.

FIG. 4 shows the structure of an opposing-data-stream cell running in the opposing-data-stream direction.

The opposing-data-stream cell 400 shown in FIG. 4 indicates whether a threshold value is exceeded, which indicates that the temporary-buffer filling level of a corresponding temporary-buffer unit is such that no further data stream cells can be temporarily buffered.

The opposing-data-stream cell 400 thus propagates in an opposing-data-stream direction 401, with the cell header now, unlike the data stream cell illustrated in FIG. 3, comprising a backpressure determination field 402 and a backpressure bit-vector field 403. The backpressure determination field 402 indicates that a backpressure exists on account of overfilling in a corresponding temporary-buffer unit, while the backpressure bit-vector field 403 indicates that the distributor device 100 is no longer able to transmit cells to the corresponding access units from the access unit to which the original data stream was applied.

The inventive circuit arrangement for data stream distribution with conflict resolution and the inventive method allow free available memory space in the chip space of the distributor device 100 to be used efficiently by virtue of existing buffer devices being distributed to small temporary-buffer devices corresponding to output access units on the distributor device 100. This significantly reduces any period of time required for maintaining communication with connected chip units.

The introduction of opposing-data-stream cells 400 ensures that no information in a data stream 200 is lost and that transmission delays are limited. In addition, the distributor device collects and disseminates information about the states of chip units connected to it and uses the information in the backpressure bit-vector field 403 of the opposing-data-stream cell 400 to forward this information.

Although the present invention has been described above with reference to preferred exemplary embodiments, it is not limited thereto but rather can be modified in a wide variety of ways.

The invention claimed is:

1. A circuit arrangement for data stream distribution, the circuit arrangement comprising:
    a distributor device having
        a matrix switching unit,
        a first temporary buffer unit in communication with the matrix switching unit, and
        a second temporary buffer unit in communication with the matrix switching unit;
    a first data stream connection unit in communication with the first temporary buffer unit, the first data stream connection unit being configured to receive a data stream having a data stream cell, the data stream cell running in an opposing data stream direction and including a back pressure determination field and a back pressure bit vector field;
    a second data stream connection unit in communication with said respective second temporary buffer unit for receiving a data stream;
    a first access unit for providing communication between the first data stream connection unit and the respective first temporary buffer units, said first access unit being configured to buffer data; and
    a second access unit for providing communication between the second data stream connection unit and the respective second temporary buffer unit, said second access unit being configured to buffer data.

2. The circuit arrangement of claim 1, wherein the matrix switching unit comprises twenty-four inputs and twenty-four outputs.

3. The circuit arrangement of claim 1, wherein the first data stream connection unit comprises at least one connection for a data line.

4. The circuit arrangement of claim 1, wherein the second data stream connection unit comprises at least one connection for a data line.

5. The circuit arrangement of claim 1, further comprising optical supply lines in data communication with the first and second data stream connection units.

6. The circuit arrangement of claim 5, wherein the first data stream connection unit is configured to receive a data stream having a data stream cell in the form of a fixed length data packet.

7. The circuit arrangement of claim 1, wherein the distributor device comprises a router at a switching center.

8. A method for distributing data streams, the method comprising:
    providing a first data stream to a first data stream connection unit connected to a first access unit configured to buffer data;
    providing a second data stream to a second data stream connection unit connected to a second access unit configured to buffer data;
    buffering the first data stream in a first buffer
    buffering the second data stream in a second buffer
    determining that a predetermined threshold value of one of the first and second buffers is exceeded;
    forming an opposing data stream cell running in an opposing data stream direction, the opposing data stream cell including a back pressure determination field and a back pressure bit vector field;
    in part on the basis of information in the opposing data stream cell, distributing the first and second data streams in a manner that avoids a data stream conflict.

9. The method of claim 8, further comprising temporarily buffering data cells such that neither the first data stream connection unit nor the second data stream connection unit receives more than one data cell in a particular cell time slot.

10. The method of claim 8, further comprising performing data alignment with buffer blocks in one of the first and second data stream connection units.

11. The method of claim 8, further comprising:
in part on the basis of information contained in a device determination field and an access-unit determination field of a data stream cell running in a forward direction, routing the data stream cell to a particular distributor device and a particular data stream connection unit.

* * * * *